INVENTOR.
Norman E. Hahn
BY Jerry Miller
Lothrop & West
Attorneys

INVENTOR.
Norman E. Hahn
Jerry Miller
BY
Lothrop & West
Attorneys

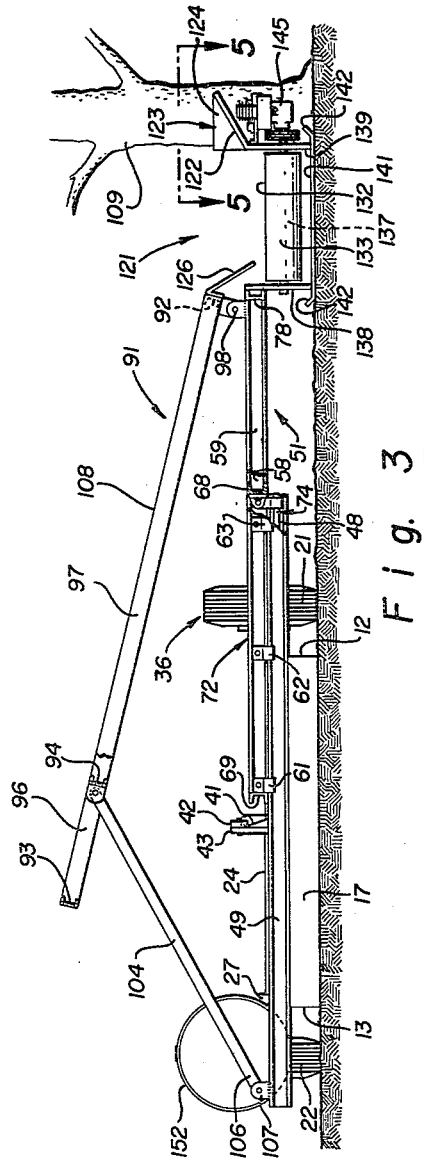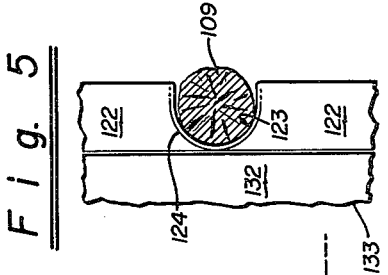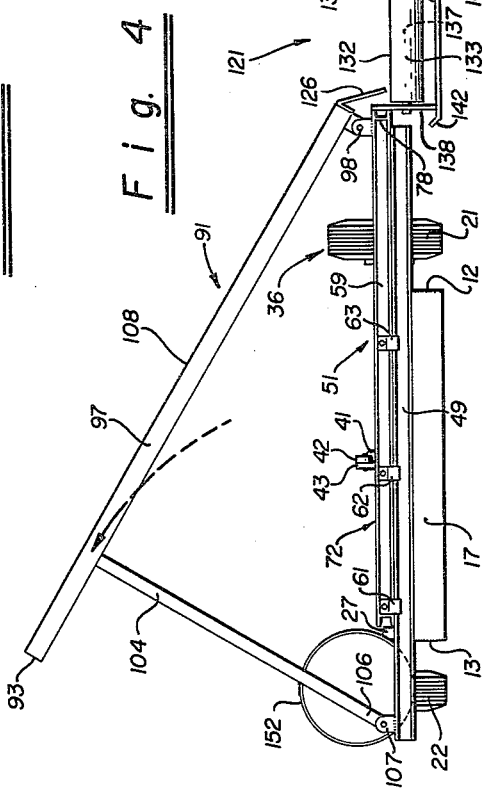
INVENTORS
Norman E. Hahn
BY Jerry Miller
Attorneys

United States Patent Office 3,105,342
Patented Oct. 1, 1963

3,105,342
HARVESTING DEVICE
Norman E. Hahn, Rte. Box 3000, Marysville, Calif., and Jerry Miller, 951 Live Oak Highway, Yuba City, Calif.
Filed May 13, 1960, Ser. No. 28,927
14 Claims. (Cl. 56—328)

This invention relates to harvesting apparatus and, more particularly, to apparatus movable to locations beneath the branches of trees and bushes bearing crops, for collecting the crops when the tree or bush is shaken and for loading the harvested crop into containers.

In harvesting tree-borne and bush-borne crops such as walnuts, pecans, plums, prunes, olives, apricots, peaches, etc., it has long been customary to spread nets or tarpaulins horizontally beneath the crop-bearing branches, either on the ground or at slight elevation so as to catch the crops without damage thereto; and then to shake, or vibrate, or knock the tree, either by hand-operated or power-operated means.

The spreading and gathering of such catching means has always been an awkward, difficult and time-consuming operation, even when the process has been aided by mechanical devices. Furthermore, the crop must also be carefully removed from the collecting devices for packing and shipping or storage in sacks, boxes, crates and bins, and this process, with means previously known, has also been difficult to accomplish without damage to or loss of much of the crop. This portion of the harvesting process is also time-consuming and is accompanied by high labor cost.

Accordingly, it is an object of the invention to provide a quickly positionable and removable power-operated frame for harvesting tree-borne and bush-borne crops, the frame also being selectively operable to concentrate and load the collected crops.

It is another object of the invention to provide a harvesting frame, as above described, adapted for rapid power-operated movement from tree to tree in a condition of readiness for operation and for rapid and fully power-operated transition from the ready to the fully operating condition.

It is another object of the invention to provide a harvesting frame, as above described, adapted for rapid concentration of the collected crop immediately after collection, during and concurrent with the movement of the frame from tree to tree.

It is a further object of the invention to provide a frame, as above described, adapted for rapid power-driven movement along a row of trees and for rapid lateral positioning thereof against the trunk and beneath the branches of each tree as the frame comes opposite thereto, and for quick lateral withdrawal of said frame and further movement along the row immediately after the tree is shaken.

It is still a further object of the invention to provide a harvesting frame which effects at least partial concentration of the collected crop as part of the procedure of withdrawing the frame from a tree.

It is still another object of the invention to provide a harvesting frame which effects speedy loading of the collected crop from several trees into shipping and storage containers of various sizes and shapes.

It is a still further object of the invention to provide a harvesting frame which collects crops from relatively low-lying branches and which concentrates and loads such crops rapidly into containers having openings positioned at a substantially higher level above the ground.

It is another object of the invention to provide a generally improved harvesting frame.

Other objects together with the foregoing are attained in the embodiment described in the following description and shown in the accompanying drawings in which:

FIGURE 3 is a rear end elevational view with the sliding frame in laterally extended position;

FIGURE 4 is a rear end elevational view with the sliding frame in retracted position; and FIGURE 5 is a plan view section taken along lines 5—5 of FIGURE 3 and showing details of the construction.

Figure 1:
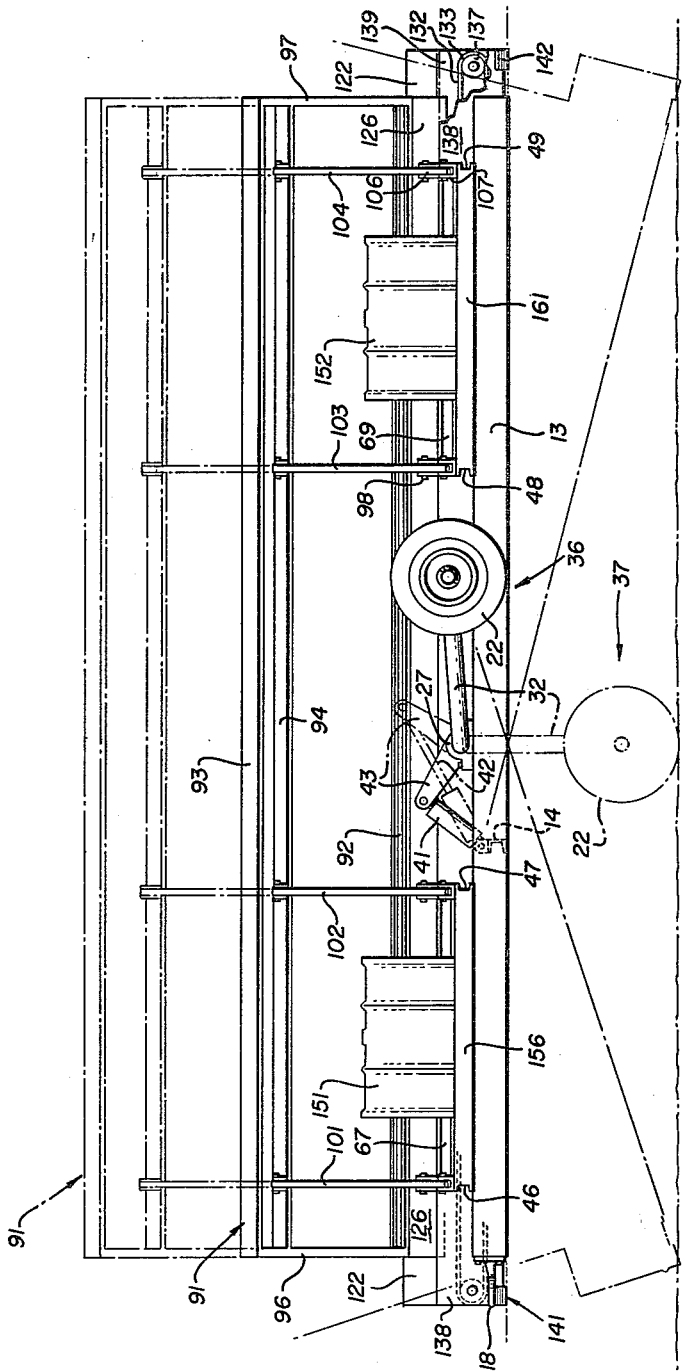
FIGURE 1 is a side elevational view of the harvesting frame of the invention in elevated position and with the elevating mechanism in elevated location shown in outline.

While the harvesting frame of the invention is susceptible of numerous physical embodiments depending upon the particular environment and requirements of use, a considerable number of the herein shown and described devices have been made, sold and used, and have performed in a most satisfactory way.

The harvesting apparatus of the invention includes a generally horizontal bed frame 11 (see FIGURE 2), or fixed frame, shown as an open elongated rectangular structure formed of metal channel side members 12 and 13, a cross bar 14, and opposite end members 16 and 17, the member 16 representing the forward end of the apparatus and having mounted thereon a draw bar 18, for attaching the apparatus to a prime mover, such as a tractor, and for drawing the apparatus as a trailer upon a pair of wheels 21 and 22 mounted near the midpoint of the length of the frame 11.

The wheels 21 and 22 also enable the frame 11 to be tilted, where desired, in a vertical longitudinal plane of the frame 11 for the purposes later explained. The wheels are accordingly mounted on a common axis 23 transverse to the frame 11 and perpendicular to a first side thereof represented by the member 12, and eccentrically with respect to a common supporting shaft 24, the shaft 24 being journalled for axial rotation on the frame 11 in journal bearings 26 and 27.

At the ends of the shaft 24 are mounted parallel legs 31 and 32 rotating in vertical planes parallel to the side 12 and terminating in outwardly directed axle members 33 and 34 on which are mounted the respective wheels 21 and 22. The legs 31 and 32 together with the respective wheels are both disposed outboard of the sides 12 and 13 and consequently constitute upwardly-retractable and downwardly-extendable wheels rotating on the shaft 24 between a fully retracted position 36 and a fully extended position 37 as shown most clearly in FIGURE 1.

In the extended position 37 of the wheels, as appears in outline in FIGURE 1, the frame 11, supported at the draw bar 18 by a tractor (not shown), is adapted to be drawn as a trailer along the highway or along a row of trees. By appropriately elevating or lowering the draw bar, the frame can be tilted lengthwise, causing the rearward end of the frame to rise or fall to the proper height for loading as will be explained.

Figure 2:
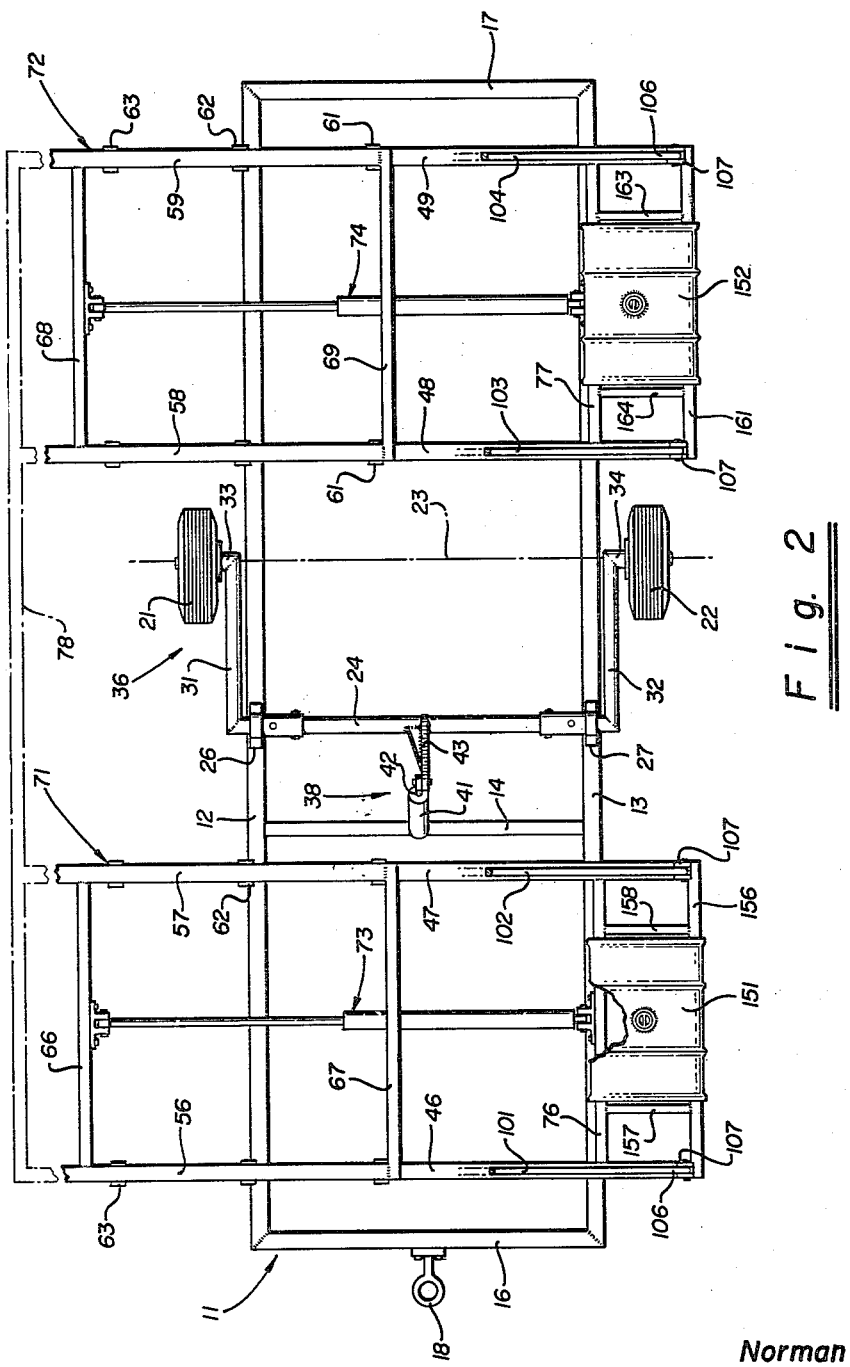
FIGURE 2 is a plan view of the frame of FIGURE 1, with the upper portion removed more clearly to show details of the structure.

In the retracted position of the wheels, shown in full line in FIGURES 1 and 2, the frame 11 is adapted to rest solidly on the ground and at the lowest possible elevation with respect to low hanging branches of the trees to be harvested.

The structure utilized to effect extension and retraction of the wheels is here shown as including a power-operated mechanism 38 for rotating the shaft 24, and includes a hydraulically-operated cylinder 41 and piston 42, the cylinder being pivotally secured to the cross bar 14 for rotation in a vertical longitudinal plane of the frame 11. The piston 42 is pivotally secured to an arm 43 mounted on and extending from the shaft 24 for rotation in a vertical longitudinal plane of the frame 11. The hydraulic assembly is arranged so that with the piston fully inserted in the cylinder the wheels 21—22 are fully retracted. The wheels can be extended downwardly with respect to the frame to any degree by application of suitable hydraulic pressure. The hydraulic apparatus is of a type well known in the art, and is therefore not here shown in detail.

The frame 11 also includes (see FIGURE 2) a plurality of generally I-beam, or rail-shaped, cross members 46, 47, 48 and 49 extending substantially laterally outwardly on both sides 12 and 13 of the frame and constituting rails upon which is slidably mounted a generally horizontally sliding or extensible or movable frame, generally designated by the numeral 51 and here shown as including transverse rail members 56, 57, 58 and 59, each slidably secured to a corresponding fixed cross member 46–49 as by suitable grips 61, 62 and 63, or brackets, spaceably mounted on the transverse sliding member 56–59 and engaging the rail portion of the corresponding cross member 46–49.

Longitudinal members 66 and 67 and longitudinal members 68 and 69, respectively, connected the transverse members 56 and 57 and the transverse members 58 and 59 into a pair of rectangular sub-frames, generally designated by the numerals 71 and 72, the outboard ends of the sub-frames being joined by the longitudinal member 78.

A pair of hydraulic cylinder and piston assemblies 73 and 74 is connected transversely across the frame 11, as from a pair of members 76 and 77 secured between the fixed rail members 46—47 and 48—49, respectively, adjacent the side 13 of the frame 11, and the other end (in this embodiment, the piston end) of each hydraulic assembly 73—74 is secured to the respective member 66 and 68. Thus, when the assemblies 73—74 are extended, as shown in FIGURES 2 and 3, the sliding frame 51 is extended in an outboard direction, that is to say, laterally away from the first side 12 of the bed frame 11; and when the assemblies 73—74 are contracted, the sliding frame 51 is retracted, as shown in FIGURE 4, generally overlying the bed frame 11. The hydraulic assemblies 73—74 are also of well-known types and therefore are not here shown in detail.

It will be noted that the extensible sub-frames 71—72 are positioned at either end of the frame 11 and are spaced apart with the wheels 21—22 between the sub-frames. Thus, the wheels, even in retracted position, do not interfere with the lateral sliding motion of the extensible or sliding frame 51. The sub-frames 71—72 are connected at their most outwardly-extending sides as by means of a member 78 (see FIGURES 3 and 4) aligned parallel to the length of the frame 11.

Above the sliding frame 51 is mounted a tilting frame 91, here shown (see FIGURE 1) as including marginal longitudinal side members 92 and 93, an intermediate longitudinal member 94, and transverse end members 96 and 97. The side 92 of the frame 91 is pivoted as by hinge pivot elements 98 (see FIGURES 3 and 4) mounted on the ends of sliding frame members 56–59 and adjacent the outboard side 78 of the sliding frame 51 so that in effect the tilting frame 91 is mounted for movement in a plane perpendicular to the first side 12 of the fixed frame 11.

At least one, and here a plurality, of supporting link members 101, 102, 103 and 104 are mounted between the bed frame 11 and the tilting frame 91 on an inboard or second side 13 generally opposite the outboard or first side 12 of the bed frame. As here shown, the lower ends 106 of the link members 101–104 are pivotally connected as by hinge pivot elements 107 to the respective bed frame members 46–49 and are arranged for pivoting motion as tilting of the frame 91 occurs; and the upper ends 108 of the link members are pivotally connected to the intermediate longitudinal tilting frame member 94, which is disposed adjacent the upper side 93 of the tilting frame, so that the link members also pivot in the same plane with respect to the tilting frame 91. Over the upper portion of the tilting frame 91 is stretched a canvas or tarpaulin 109 for catching and collecting crops.

As may be seen in FIGURES 3 and 4, the assembly of bed frame 11, sliding frame 51, tilting frame 91 and link members 101–104 forms a structure that is generally triangular in cross section, so that upon lengthening or contracting of the side of the triangle represented by the bed frame 11 and the sliding frame 51, as by operating the hydraulic assemblies 73—74 to extend or retract the sliding frame 51 with respect to the bed frame 11, the link members 101–104 cooperate to urge the tilting frame 91 between positions of lesser (FIGURE 3) and greater (FIGURE 4) inclination with respect to the bed and sliding frames. It is noted also that the tilting frame 91 is so disposed on the link members 101–104 that in all positions of tilt, the frame 91 clears the wheels 21—22 even in their retracted positions (FIGURES 3 and 4).

It will be seen that the assembly so far described constitutes a quickly-deployable power-operated device for gathering tree-borne crops. In operation, the entire apparatus, with the wheels 21—22 in extended position and the sliding and tilting frames 51 and 91 in retracted position, is drawn down a row of trees to be harvested. During movement down the row, the wheels 21—22 are retracted far enough to lower the outboard or lowermost edge 92 of the tilting frame to a position beneath the level of the tree branches. Then, as the center of the machine comes abreast a tree 109, the machine is stopped. The hydraulic assemblies 73—74 are thereupon operated to extend the sliding and tilting frames 51 and 91 as far outwardly beneath the branches as may be required (FIGURE 3). The tree is shaken and the falling crop is collected on the tarpaulin 108 on the tilting frame 91. The sliding and tilting frames 51 and 91 are then retracted, the wheels 21—22 are extended to raise the apparatus to travelling position, and the apparatus is drawn onward to the next tree in the row.

As an important feature of the invention, the sliding frame 51 also includes an elongated concentrating channel 121 formed generally in the horizontal plane of the sliding frame and outboard of the pivoted side of the tilting frame 91, particularly as shown in FIGURES 3 and 4, the channel running from end to end of the apparatus parallel to the first side 12 of the bed frame 11.

The sliding frame 51 also has an extension portion 122, or plate, outboard of the concentrating channel 121, the plate 122 being inclined substantially downwardly and inwardly for drainage of crops falling thereon down the slope thereof and into the concentrating channel 121.

The portion 122 also has a central notch 123 (FIGURE 5) formed therein for fitting around the adjacent portion of the trunk of the tree 109 to be harvested, as shown in FIGURES 3 and 5. The notch 123 is in part defined by a conforming U-shaped vertical wall 124, which bears against the tree trunk and provides reinforcement for the extension portion 122 in the vicinity of the notch 123.

Also, the tilting frame 91 has an apron 126 extending from the upper face of the pivoted side thereof and downwardly to drain into the concentrating channel 121 (see FIGURES 3 and 4).

As a further important feature of the invention, the device as above described is particularly adapted to concentrate the collected crop, first from a dispersed condition over the whole "area" of the upper frame 91 to a partially-concentrated condition along the "line" of the concentrating channel 121, and second from this condition to a fully-concentrated condition at a "point" represented by an end of the concentrating channel 121.

It will be seen that the tilting upper crop-catching frame 91 in extended position (FIGURE 3) is made to lie as low to the ground as possible so as to underlie the lowermost branches of the tree 109. In this position, the frame 91 has but slight inclination to the horizontal and crops may or may not drain completely therefrom into the concentrating channel 121. Upon retraction of the frame 91, as for withdrawing it from engagement with the tree 109 in preparation for movement to the next tree, the frame 91, as previously described, is constrained automatically to swing to a position of greater inclination (FIGURE 4). This action, together with the natural vibration accompanying it, causes substantially all of the collected crop to drain into the concentrating channel 121.

Furthermore, from time to time, and whenever the channel 121 becomes sufficiently full, the wheels 21—22 may be extended to a greater degree so as to support the apparatus at greater central elevation and just at or slightly off its center of balance. The tractor's hitch mechanism can thereupon be activated and the apparatus tilted endwise so that the crop in channel 121 is drained from one end of the channel and into a low-lying box placed at the discharge end of the channel.

As a further important feature of the invention, the concentrating channel 121 is here shown as formed by the upper run 132 of a conveyor belt 133, the run 132 being mounted for motion (in this example) in a rearward direction parallel to the first side 12 of the bed frame 11, the belt being stretched between end rollers 136 and 137, which in turn are mounted between parallel side members 138 and 139. The member 138 is affixed to the member 78 of the sliding frame 91, and the member 139, which supports the extension portion 122, is structurally connected to the member 138 as by a plurality of lower sled or runner members 141 having upturned ends 142 and disposed transversely beneath the lower run of the belt 133 and at generally ground level when the wheels 21—22 are fully retracted with the bed frame 11 resting on the ground as shown in FIGURES 3 and 4. The runners 141 serve to support the heavy extended side of the sliding and tilting frames 51 and 91 during extension and retraction, and the vibration induced by the runners 141 moving over the ground surface during retraction helps to urge downwardly the collected crop into the channel 121. Suitable mechanism, such as a motor 145, is connected to the rollers of the conveyor belt 133 for selectively operating the belt.

The device including the conveyor belt 133 is particularly well adapted for concentrating and unloading the collected crop into large "bulk" boxes having very high sides. With the wheels 21—22 extended the apparatus can be tilted longitudinally with the rear end 17 at sufficient elevation to discharge the conveyor belt directly into the upper openings of a high "bulk" box located at the rear end of the conveyor; and the belt is operated with the upper run 132 moving rearwardly and upwardly to carry the collected crop to the box. Where suitable, the wheel supports can be made sufficiently long to permit loading of the crop from the belt into the box without the necessity of tilting the device lengthwise.

Another feature of the invention lies in the provision of ballast or counterbalances, here shown as including a pair of drums 151 and 152 mounted respectively on the extending ends of the bed frame members 46—47 and 48—49, as by supporting cross members 76, 156, 157 and 158, and 77, 161, 162 and 163 forming cradles for the drums. Thus, the drums 151—152 are positioned as far as possible opposite the heavily-loaded and often extended channel 121. The drums are filled to a desired degree with water or other weighty substance to counterbalance the loaded weight of the channel 121, especially while the apparatus is being drawn in its extended condition from one tree to another, or is being tilted endwise for discharging into boxes.

In operation, the device of the invention is especially useful when used in pairs, the pair being arranged with the extendable sides facing and on opposite side of a row of trees. The pair is drawn together in parallel fashion, along the row, and in coming abreast of each successive tree, the machines are stopped and the sliding frames are extended laterally to engage simultaneously all sides of the tree trunk and to underlie all of the tree branches. Thus, when the tree is shaken, all of the crop is collected in one action and substantially none of the crop escapes to the ground.

As soon as the crop has been shaken from the tree the sliding frames on each of the machines is retracted far enough to clear the tree trunk. The wheels on both machines are then swung downwardly far enough to lift the frames off the ground and to permit movement toward the next tree to be harvested.

As soon as the tarpaulin and the conveyor become covered with fruit, a box is located at the discharge end of the conveyor and the conveyor is set in motion. The vibration resulting from the conveyor is often sufficient to cause the crop to roll off the tarpaulin. If not, the tilting frame can be raised until the crop does roll onto the conveyor and from there into the box. Then, when the crop is loaded the machine can be moved onwardly to the next tree where the harvesting cycle is again resumed.

What is claimed is:

1. An apparatus for harvesting tree-borne crops, said apparatus comprising: a generally horizontal bed frame; a generally horizontally sliding frame mounted thereon for extension from a first side thereof; a tilting frame mounted above and pivotally connected to the most outwardly extending side of said sliding frame for tilting movement in a plane perpendicular to said first side of said bed frame; at least one supporting link member having a lower end pivotally connected to said bed frame on a second opposite side thereof and arranged for pivoting motion in said plane; said link member having an upper end pivotally connected to said tilting frame for relative pivoting motion with respect thereto in said plane; and means for extending and retracting said sliding and said tilting frames with respect to said bed frame, whereby said link member cooperates therewith to urge said tilting frame between corresponding positions of lesser and greater inclination with respect to said bed and said sliding frames.

2. The device of claim 1, wherein said sliding frame includes an elongated concentrating channel formed in the horizontal plane of said sliding frame outboard of the pivoted side of said tilting frame and running parallel to said first side of said bed frame.

3. The device of claim 2, wherein said sliding frame includes an extension portion outboard of said concentrating channel, said extension portion having a central notch formed therein for fitting around a portion of the trunk of a tree to be harvested.

4. The device of claim 2 and also including selectively operable means for tilting said frames and channel in a vertical plane parallel to said first side of said bed frames to cause an inclination of said channel.

5. The device of claim 4, wherein said concentrating channel is formed by the upper run of a conveyor belt mounted for motion in a first direction parallel to said first side of said bed frame, and means for selectively operating said conveyor belt, said tilting means being operable to tilt said frames and said belt upwardly in said first direction for causing discharge of said conveyor belt into boxes of substantial vertical dimensions.

6. The device of claim 4, wherein said tilting means includes a pair of upwardly-retractable ground-engaging wheels mounted on a common axis perpendicular to said first side of said bed frame, and means for extending and retracting said wheels for respectively tilting and leveling said frames and said belt.

7. The device of claim 6, wherein said wheels are mounted eccentrically with respect to a common supporting shaft, said shaft being journalled for axial rotation on said bed frame, and power-operated means for rotating said shaft.

8. The device of claim 7 wherein said bed frame includes means at a forward end thereof for attaching said apparatus to a prime mover and for drawing said apparatus as a trailer upon said wheels in extended position.

9. In combination, a pair of devices as described in claim 1 for use on opposite sides of a tree to be harvested, said devices being disposed in mirror symmetry, and said respective sliding and tilting frames being extendable beneath the branches of said tree.

10. A harvesting device comprising an elongated bed frame, a slidable frame translatably mounted on said bed frame and being transversely movable between a first position substantially overlying said bed frame and second position wherein a substantial portion of said slidable frame extends outboard from said bed frame, and a tilting frame adapted to support harvested crops, said tilting frame being pivotally mounted on the outboard side of said slidable frame and being pivotable about a longitudinal axis, said tilting frame including a link member pivotally mounted at one end on said bed frame and at the other end on said tilting frame whereby movement of said slidable frame between said first and said second positions effects a corresponding angular inclination of said tilting frame between a first attitude of relatively high angularity and a second attitude of relatively low angularity.

11. The device of claim 10 further characterized by a longitudinal conveyor mounted on the outboard side of said slidable frame and disposed along the outboard side of said tilting frame, said conveyor being capable of transporting harvested crops gravitally moved from said tilting frame onto said conveyor as said tilting frame is urged to an attitude of relatively high angularity.

12. A harvesting device comprising: a generally horizontal, rectangular, elongated bed frame, said bed frame including a first side member adapted to face toward a tree to be harvested, and a second side member remote therefrom; a sliding frame translatably mounted on said bed frame and adapted for transverse movement thereon between a first position substantially overlying said bed frame and a second position extending outwardly over said first side member and into juxtaposition with said tree; an elongated tilting frame pivotally mounted on the side of said sliding frame facing toward said tree for tilting movement about a longitudinal axis, said tilting frame generally overlying said bed frame in angular relation thereto; and a link member pivotally mounted at one end on said second side member of said bed frame and at the other end on said tilting frame, said lever being swingable by said sliding frame and said tilting frame between a first relatively low angle as said sliding frame is in said second position and a second relatively high angle as said sliding frame is in said first position.

13. The device of claim 12 further characterized by supporting wheels; means for elevating and lowering said bed frame relative to said wheels; and means for longitudinally shifting the center of gravity of said bed frame relative to said wheels concurrently with the elevating and lowering movement thereof.

14. An apparatus for harvesting tree-borne crops, said apparatus comprising: a generally horizontal bed frame; a cushion frame over said bed frame; means supporting said cushion frame over said bed frame for lateral movement to project one edge of said cushion frame outwardly of one edge of said bed frame a link pivoted to said cushion frame adjacent the other edge thereof and to means on said bed frame about axes parallel to said one edge whereby said link forces said other edge of said cushion frame to swing upwardly as said cushion frame moves laterally inwardly of said bed frame.

References Cited in the file of this patent

UNITED STATES PATENTS

| | | |
|---|---|---|
| 2,293,486 | Barrett | Aug. 18, 1942 |
| 2,436,648 | Isom | Feb. 24, 1948 |
| 2,692,470 | Boman | Oct. 26, 1954 |
| 2,714,281 | Steele | Aug. 2, 1955 |